United States Patent
Shimizu et al.

(10) Patent No.: US 8,879,206 B2
(45) Date of Patent: Nov. 4, 2014

(54) MAGNETIC RECORDING HEAD WITH SPIN TORQUE OSCILLATOR

(71) Applicant: Kabushiki Kaisha Toshiba, Tokyo (JP)

(72) Inventors: Mariko Shimizu, Kawasaki (JP);
Katsuhiko Koui, Yokohama (JP);
Shuichi Murakami, Tokyo (JP);
Masahiro Takashita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/717,327

(22) Filed: Dec. 17, 2012

(65) Prior Publication Data
US 2013/0314820 A1    Nov. 28, 2013

(30) Foreign Application Priority Data
May 25, 2012  (JP) .................. 2012-120209

(51) Int. Cl.
| | | |
|---|---|---|
| G11B 5/127 | (2006.01) | |
| G11B 5/187 | (2006.01) | |
| G11B 5/48 | (2006.01) | |
| G11B 5/31 | (2006.01) | |
| G11B 5/00 | (2006.01) | |

(52) U.S. Cl.
CPC ...... *G11B 5/3133* (2013.01); *G11B 2005/0024* (2013.01); *G11B 5/4833* (2013.01); *G11B 5/3146* (2013.01); *G11B 5/314* (2013.01)
USPC .................. 360/125.3; 360/125.71

(58) Field of Classification Search
USPC .................. 360/125.3, 128, 125.71
See application file for complete search history.

(56) References Cited

U.S. PATENT DOCUMENTS

| | | | |
|---|---|---|---|
| 7,430,135 B2 | 9/2008 | Huai et al. | |
| 8,547,662 B2* | 10/2013 | Yamada et al. ............ | 360/125.3 |
| 8,605,391 B2* | 12/2013 | Koui et al. ................ | 360/324.1 |
| 2009/0316303 A1 | 12/2009 | Yamada et al. | |
| 2011/0228423 A1* | 9/2011 | Koui et al. ...................... | 360/75 |
| 2012/0134046 A1* | 5/2012 | Matsumoto et al. ........ | 360/99.08 |
| 2013/0314820 A1* | 11/2013 | Shimizu et al. ............ | 360/244.5 |

FOREIGN PATENT DOCUMENTS

| | | | | |
|---|---|---|---|---|
| JP | 2008277586 A | * | 11/2008 | |
| JP | 2008305486 A | * | 12/2008 | |
| JP | 2009-049101 | | 3/2009 | |
| JP | 2009-521807 | | 6/2009 | |
| JP | 2009-242854 | | 10/2009 | |
| JP | 2010-003354 | | 1/2010 | |
| JP | 2011-106429 | | 6/2011 | |

* cited by examiner

*Primary Examiner* — Brian Miller
(74) *Attorney, Agent, or Firm* — Knobbe, Martens, Olson & Bear LLP

(57) ABSTRACT

According to one embodiment, a magnetic recording head includes a main magnetic pole, an auxiliary magnetic pole, and a spin torque oscillator formed between them. The spin torque oscillator includes a main oscillation layer and spin sink layer as an oscillation layer. The spin sink layer contains one of iron and cobalt, and at least one element selected from the group consisting of platinum, palladium, ruthenium, tantalum, chromium, terbium, gadolinium, europium, dysprosium, and samarium.

27 Claims, 6 Drawing Sheets

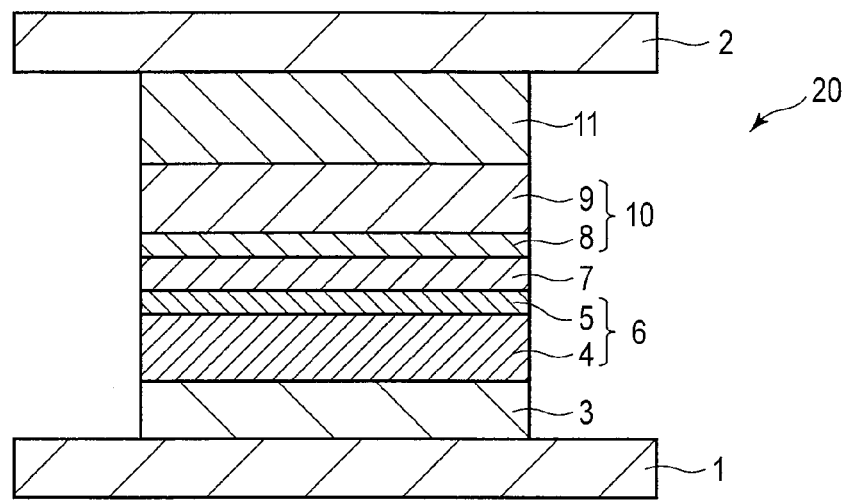
F I G. 1A
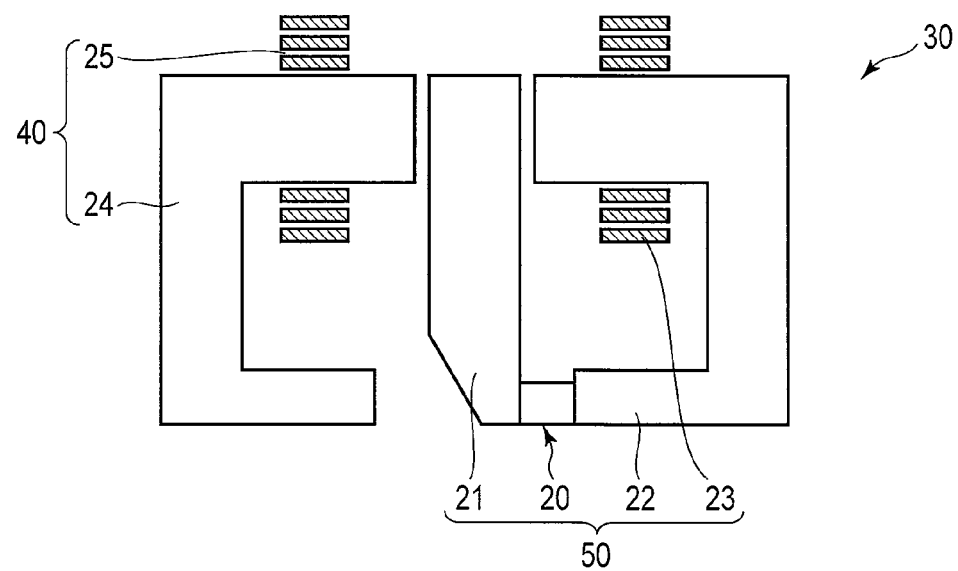
F I G. 2

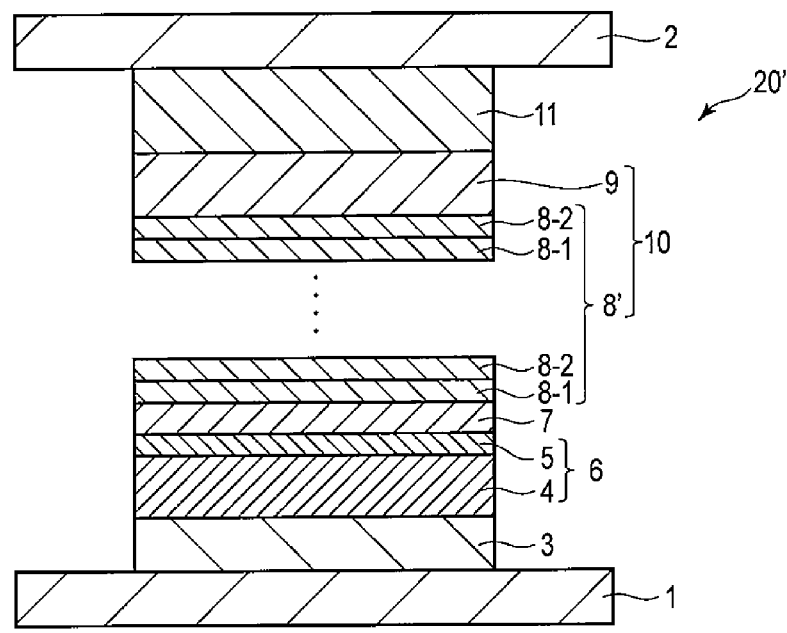
F I G. 1B
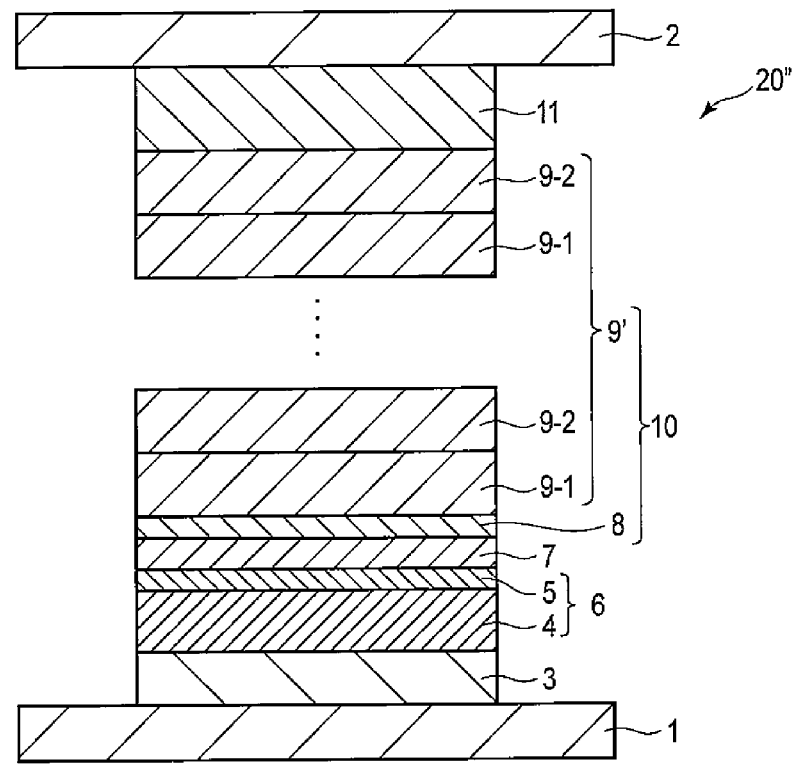
F I G. 1C

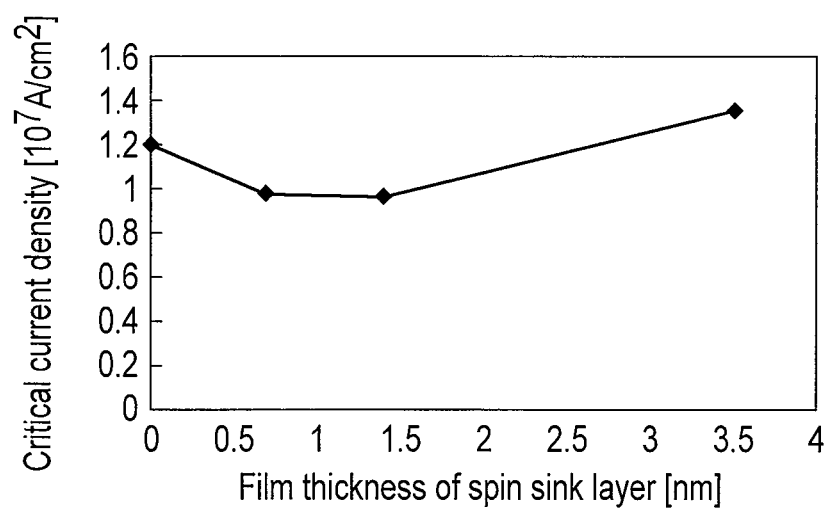
F I G. 11

MAGNETIC RECORDING HEAD WITH SPIN TORQUE OSCILLATOR

CROSS-REFERENCE TO RELATED APPLICATIONS

This application is based upon and claims the benefit of priority from Japanese Patent Application No. 2012-120209, filed May 25, 2012, the entire contents of which are incorporated herein by reference.

FIELD

Embodiments described herein relate generally to a magnetic recording head, magnetic head assembly, and magnetic recording/reproduction apparatus.

BACKGROUND

Perpendicular magnetic recording more advantageous for high-density recording in principle than in-plane magnetic recording increases the recording density of a hard disk drive (HDD) by about 40% per year. It is probably not easy to achieve a high recording density even by using the perpendicular magnetic recording method because the problem of thermal decay becomes serious again.

"A high-frequency field assisted recording method" has been proposed as a recording method capable of solving this problem. In this high-frequency field assisted recording method, a high-frequency magnetic field much higher than a recording signal frequency and close to the resonance frequency of a magnetic recording medium is locally applied to it. Consequently, the medium resonates, and the coercive force (Hc) of the medium in the portion to which the high-frequency magnetic field is applied becomes half the original coercive force or less. By using this effect, it is possible, by superposing a high-frequency magnetic field on a recording magnetic field, to perform magnetic recording on a medium having a higher coercive force (Hc) and a higher magnetic anisotropic energy (Ku). If a high-frequency magnetic field is generated by using a coil, however, it becomes difficult to efficiently apply the high-frequency magnetic field to a medium.

As a high-frequency magnetic field generating means, therefore, a method using a spin torque oscillator has been proposed. In the disclosed technique, the spin torque oscillator includes a spin transfer layer, interlayer, magnetic material layer (oscillation layer), and electrode. When a direct current is supplied to the spin torque oscillator through the electrode, magnetization in the magnetic material layer ferromagnetically resonates due to spin torque generated by the spin transfer layer. As a consequence, the spin torque oscillator generates a high-frequency magnetic field. Since the size of the spin torque oscillator is about a few ten nm, the generated high-frequency magnetic field locally exists in a region of about a few ten nm in the vicinity of the spin torque oscillator. In addition, an in-plane component of the high-frequency magnetic field can efficiently resonate a perpendicularly magnetized medium, and largely decrease the coercive force of the medium. Consequently, high-density magnetic recording is performed in only a portion where the recording magnetic field of the main magnetic pole and the high-frequency magnetic field of the spin torque oscillator are superposed. This makes it possible to use a medium having a high coercive force (Hc) and high magnetic anisotropic energy (Ku). Accordingly, the problem of thermal decay in high-density recording can be avoided.

To implement a high-frequency field assisted recording head, it is important to design and manufacture a spin torque oscillator capable of stably oscillating with a low driving current, and generating an in-plane, high-frequency magnetic field that sufficiently resonates medium magnetization.

A maximum current density that can be supplied to a spin torque oscillator is, e.g., $2 \times 10^8$ A/cm$^2$ when the element size is about 70 nm. If the current density is higher than that, the characteristics deteriorate due to, e.g., the heat generation and migration of the spin torque oscillator. Therefore, it is important to design a spin torque oscillator capable of oscillating at as low a current density as possible.

On the other hand, to sufficiently resonate medium magnetization, it is reportedly desirable to set the intensity of an in-plane, high-frequency magnetic field at 10% or more of the anisotropic magnetic field (Hk) of the medium. Examples of a means for increasing the intensity of the longitudinal high-frequency magnetic field are increasing the saturation magnetization of an oscillation layer, increasing the thickness of the oscillation layer, and increasing the rotational angle of magnetization in the oscillation layer. Unfortunately, any of these means increases a driving current.

As described above, decreasing the current density of the driving current is inconsistent with increasing the intensity of the in-plane, high-frequency magnetic field, so a spin torque oscillator meeting these conditions at the same time is desirable.

BRIEF DESCRIPTION OF THE DRAWINGS

FIG. 1A, FIG. 1B, and FIG. 1C are sectional views showing spin torque oscillators according to embodiments;

FIG. 2 is an exemplary view of a magnetic head according to an embodiment;

FIG. 11 is a graph showing the relationship between the film thickness of a spin sink layer and the critical current density of a spin torque oscillator used in an embodiment.

DETAILED DESCRIPTION

Figure 3:
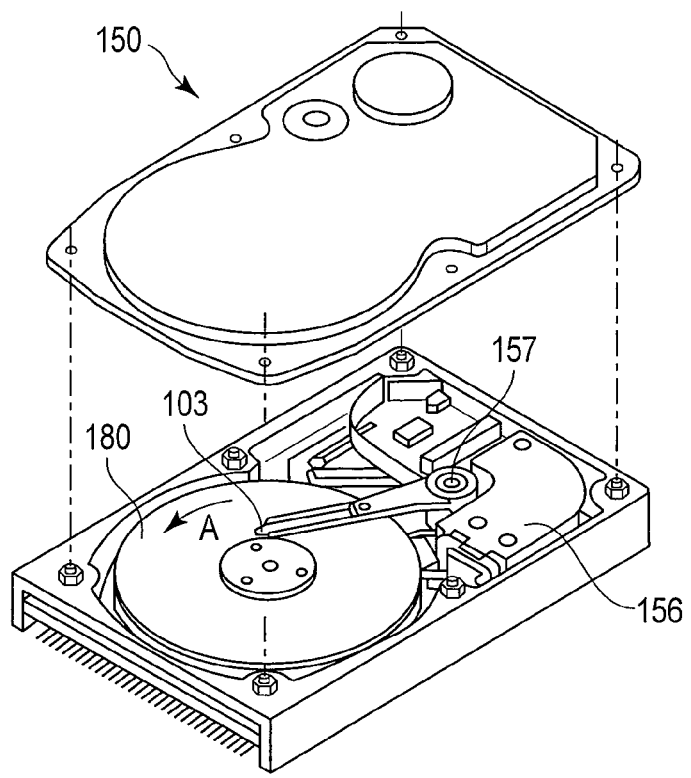
FIG. 3 is an exemplary view of a magnetic recording/reproduction apparatus according to an embodiment.

A magnetic recording head according to an embodiment includes a main magnetic pole for applying a recording magnetic field to a magnetic recording medium, an auxiliary magnetic pole forming a magnetic circuit together with the main magnetic pole, and a spin torque oscillator formed between the main magnetic pole and auxiliary magnetic pole. The spin torque oscillator includes a spin transfer layer and oscillation layer formed in this order from the main magnetic pole side, and an interlayer formed between the spin transfer layer and oscillation layer. The oscillation layer includes a spin sink layer and main oscillation layer formed from the spin transfer layer side. The spin sink layer contains one of Fe and Co, and at least one element selected from the group consisting of Pt, Pd, Ru, Ta, Cr, Tb, Gd, Eu, Dy, and Sm.

A magnetic head assembly according to an embodiment includes the above-mentioned magnetic recording head, a head slider on which the magnetic recording head is mounted, a suspension on one end of which the head slider is mounted, and an actuator arm connected to the other end of the suspension.

A magnetic recording/reproduction apparatus according to an embodiment includes a magnetic recording medium and the above-mentioned magnetic recording head.

In the embodiment, the spin sink layer containing one of Fe and Co and at least one element selected from the group consisting of Pt, Pd, Ru, Ta, Cr, Tb, Gd, Eu, Dy, and Sm is used as the oscillation layer. Accordingly, a spin torque oscillator capable of oscillating at a low critical current density can be obtained. Since oscillation can be performed at a low voltage by decreasing the critical current density, a larger high frequency is output when the same voltage is applied. Therefore, an assisting magnetic field can be driven at a low voltage while a high-frequency magnetic field is maintained.

When using the magnetic head according to the embodiment, the magnetization of a magnetic recording medium can be reversed with a large high-frequency magnetic field by using a spin torque oscillator having a low critical current density as a high-frequency field generation source.

As shown in FIG. 1B, the spin sink layer 8' can be formed by alternately stacking a layer 8-1 containing one of Fe and Co, and a layer 8-2 containing at least one element selected from the group consisting of Pt, Pd, Ru, Ta, Cr, Tb, Gd, Eu, Dy, and Sm. This can decrease the critical current density of the spin torque oscillator.

The main oscillation layer can contain at least one element selected from Fe, Co, and Ni. For example, as shown in FIG. 1C, the main oscillation layer 9' can be formed by alternately stacking a layer 9-1 containing one of Fe and Co, and a layer 9-2 containing Ni. This can decrease the critical current density of the spin torque oscillator.

The main oscillation layer can contain one of Fe and Co, and at least one element selected from the group consisting of Al, Si, Ga, Ge, Cu, Ag, Au, B, Mn, and Sn. For example, as shown in FIG. 1C, the main oscillation layer 9' can be formed by alternately stacking a layer 9-1 containing one of iron and cobalt, and a layer 9-2 containing at least one element selected from the group consisting of Al, Si, Ga, Ge, Cu, Ag, Au, B, Mn, and Sn. This can decrease the critical current density of the spin torque oscillator.

The embodiment will be explained in more detail below with reference to the accompanying drawings.

FIG. 1A, FIG. 1B, and FIG. 1C are sectional views showing examples of the spin torque oscillators 20, 20', and 20" according to the embodiments.

A spin torque oscillator 20 has a bottom-spin transfer layer structure in which a multilayered film is formed between a lower electrode 1 and upper electrode 2, and has an arrangement in which a spin transfer layer 6 is formed on an underlayer 3, an interlayer 7 is formed on the spin transfer layer 6, an oscillation layer 10 is formed on the interlayer 7, and a cap layer 11 is formed on the oscillation layer 10. The spin transfer layer 6 has a multilayered structure including a main spin transfer layer 4 formed on the underlayer 3, and an interface magnetic layer 5 formed on the main spin transfer layer 4. The oscillation layer 10 has a multilayered structure including a spin sink layer 8 formed on the interlayer 7, and a main oscillation layer 9 formed on the spin sink layer 8.

The individual layers of the spin torque oscillator shown in FIG. 1A, FIG. 1B, and FIG. 1C will be explained in more detail below.

As the main spin transfer layer, it is possible to use CoCr-based alloys such as CoCrPt, CoCrTa, CoCrTaPt, and CoCrTaNb, RE-TM-based amorphous alloys such as TbFeCo, artificial lattices such as FeCo/Ni, CoFe/Ni, Co/Ni, Co/Pt, and Co/Pd, and FePt-, CoPt-, and SmCo-based alloys.

As the interface magnetic layer, it is possible to use an alloy formed by adding at least one element selected from Al, Si, Ga, Ge, Cu, Ag, and B to FeCo or an FeCo alloy, or an FeCo artificial lattice. It is also possible to use a Heusler alloy such as $Co_2MnGe$ or $Co_2MnSi$.

As the interlayer, a nonmagnetic material having a large spin diffusion length such as Cu, Ag, or Au is used.

The spin sink layer contains at least one element selected from a first group consisting of Fe and Co, and at least one element selected from a second group consisting of Pt, Pd, Ru, Ta, Cr, Tb, Gd, Eu, Dy, and Sm.

As the main oscillation layer, it is possible to use an alloy such as FeCo or NiFe, an alloy formed by adding at least one element selected from Al, Si, Ga, Ge, Cu, Ag, Au, B, Mn, and Sn to an FeCo alloy, or an artificial lattice such as Fe/Co or FeCo/Ni.

The film thickness of the spin sink layer can be 0.1 (inclusive) to 3 (inclusive) nm. If the film thickness is less than 0.1 nm, spin torque transfer is often impossible. If the film thickness is 3 nm or more, the influence of the damping loss of the spin sink layer in the whole oscillation layer often becomes significant. For example, the damping loss of the spin sink layer can be less than 1.1 times that of the main oscillation layer. In this case, letting $t1$, $\alpha 1$, and $Ms1$ be the film thickness, damping constant, and saturation magnetization, respectively, of the spin sink layer, and $t2$, $\alpha 2$, and $Ms2$ be the film thickness, damping constant, and saturation magnetization, respectively, of the main oscillation layer, the film thickness ratio of $t1$ to $t2$ is determined to satisfy $t1*\alpha 1*Ms1 < 1.1*t2*\alpha 2*Ms2$. In Example 2, $t1 < 0.23*t2$ need only be satisfied because $\alpha 1 = 0.05$, $Ms1 = 1.1$ T, $\alpha 2 = 0.005$, and $Ms2 = 2.3$ T. When the film thickness $t2$ of the main oscillation layer is about 10 nm, the film thickness $t1$ of the spin sink layer need only be 2.3 nm or less.

The content of at least one element selected from the second group in the spin sink layer is appropriately 0.5 (inclusive) to 75 (inclusive) at %. If the content is less than 0.5 at %, the effect of shortening the spin diffusion length is not found. If the content exceeds 75 at %, exchanging coupling acting between the spin sink layer and main oscillation layer weakens, and this makes the oscillation of the main oscillation layer impossible. When the spin sink layer is an alloy as in Example 1, the content can be 0.5 (inclusive) to 40 (inclusive) at %.

FIG. 2 is an exemplary view showing an example of the magnetic head according to the embodiment.

A magnetic recording head 30 according to the embodiment includes a reproducing head unit 40 and writing head unit 50. The reproducing head unit 40 includes a magnetic reproducing element (not shown), excitation coil 25, and leading shield 24. The writing head unit 50 includes a main magnetic pole 21 as a recording magnetic pole, a trailing shield (auxiliary magnetic pole) 22 for returning a magnetic field from the main magnetic pole 21, the spin torque oscillator 20 formed between the main magnetic pole 21 and trailing shield (auxiliary magnetic pole) 22, and an excitation coil 23. In the writing head unit 50 of the high-frequency field assisted recording head 30, a gap magnetic field between the main magnetic pole 21 and trailing shield 22 applies an external magnetic field perpendicular to the film surface, and the oscillation layer performs precession around an axis almost perpendicular to the film surface as a rotational axis, thereby generating a high-frequency magnetic field outside. By superposing the high-frequency magnetic field generated from the spin torque oscillator on the magnetic field applied from the main magnetic pole, write can be performed on a magnetic recording medium corresponding to a higher recording density.

FIG. 3 is an exemplary perspective view showing an outline of the arrangement of the magnetic recording/reproduction apparatus capable of incorporating the magnetic head according to the embodiment.

That is, a magnetic recording/reproduction apparatus 150 is an apparatus using a rotary actuator. Referring to FIG. 3, a recording medium disk 180 is fitted on a spindle 152, and rotated in the direction of an arrow A by a motor (not shown) that responds to a control signal from a driver controller (not shown). The magnetic recording/reproduction apparatus 150 may also include a plurality of medium disks 180.

A head slider 103 for performing information recording and reproduction on the medium disk 180 has the arrangement as described above with reference to FIG. 2, and is attached to the distal end of a thin-film suspension 154. The magnetic recording head according to the embodiment, for example, is mounted near the distal end of the head slider 103.

When the medium disk 180 rotates, an air bearing surface (ABS) of the head slider 103 is held with a predetermined floating amount from the surface of the medium disk 180. The slider may also be a so-called "contact running type" slider that comes in contact with the medium disk 180.

The suspension 154 is connected to one end of an actuator arm 155 including a bobbin holding a driving coil (not shown). A voice coil motor 156 as a kind of a linear motor is formed at the other end of the actuator arm 155. The voice coil motor 156 includes the driving coil (not shown) wound around the bobbin of the actuator arm 155, and a magnetic circuit including a permanent magnet and counter yoke arranged to oppose each other so as to sandwich the coil.

The actuator arm 155 is held by ball bearings (not shown) formed in two, upper and lower portions of a spindle 157, and freely rotated by the voice coil motor 156.

Figure 4:
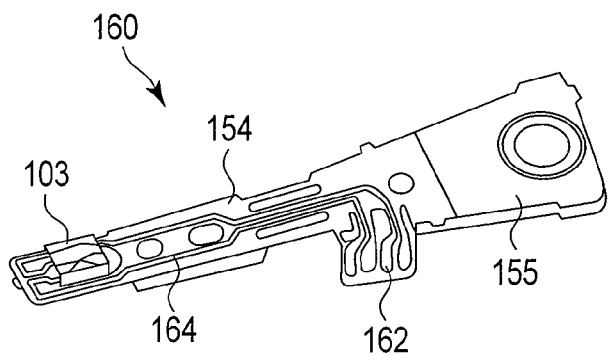
FIG. 4 is an exemplary view of a magnetic head assembly according to an embodiment.

FIG. 4 is an exemplary view showing an example of the magnetic head assembly according to the embodiment.

FIG. 4 is an enlarged perspective view in which a magnetic head assembly formed ahead of the actuator arm 155 is viewed from the disk side. That is, a magnetic head assembly 160 includes the actuator arm 155 including the bobbin holding the driving coil, and the suspension 154 is connected to one end of the actuator arm 155.

The head slider 103 including the magnetic recording head 30 shown in FIG. 2 is attached to the distal end of the suspension 154. The suspension 154 includes lead wires 164 for signal write and read. The lead wires 164 are electrically connected to electrodes of the magnetic head assembled in the head slider 103. Reference numeral 162 in FIG. 4 denotes electrode pads of the magnetic head assembly 160.

EXAMPLES

The embodiment will be explained in more detail below by way of its examples.

Example 1

A spin torque oscillator having the following arrangement was manufactured.

First, layers from an underlayer to a cap layer were formed by using the following materials on an electrode made of Ta/Cu/Ta. The deposition method was DC magnetron sputtering, and the back pressure of deposition was $1 \times 10^{-6}$ Pa. After that, an upper electrode made of Ta/Au was formed.

Electrode (Ta 5 nm/Cu 250 nm/Ta 35 nm)/underlayer (Ta 3 nm/Ru 2 nm/Cu 2 nm)/main spin transfer layer ((FeCo 0.2 nm/Ni 0.6 nm)*15 layers)/interface magnetic layer (FeCo 0.4 nm)/interlayer (Cu 3 nm)/spin sink layer (FeCo-5 at % Pt 0.8 nm)/main oscillation layer (FeCo 10 nm)/cap layer (Ru 15 nm)/electrode (Ta 5 nm/Au 100 nm)

The critical current density can be measured by using the obtained spin torque oscillator by measuring the R—H characteristic when changing the bias voltage.

The critical current density of the spin torque oscillator having the above arrangement was measured when no spin sink layer was formed, and when the film thickness of the spin sink layer was changed.

Figure 5:
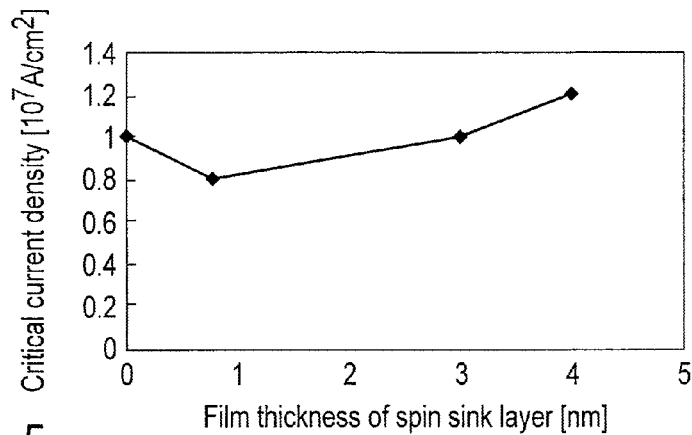
FIG. 5 is a graph showing the relationship between the film thickness of a spin sink layer and the critical current density of a spin torque oscillator used in an embodiment.

FIG. 5 shows the relationship between the film thickness of the spin sink layer and the critical current density in the spin torque oscillator manufactured in Example 1.

The critical current density was $1*10^7$ A/cm$^2$ when no spin sink layer was formed, but decreased to $0.8*10^7$ A/cm$^2$ when a 0.8-nm thick FeCoPt spin sink layer was inserted. Since the spin diffusion length of the spin sink layer was short, the characteristic length of spin torque acting near the interface between the interlayer and spin sink layer shortens. The critical current density presumably decreases as a result of that. In Example 1, the critical current density decreased when the film thickness of the spin sink layer was 3 nm or less.

Figure 6:
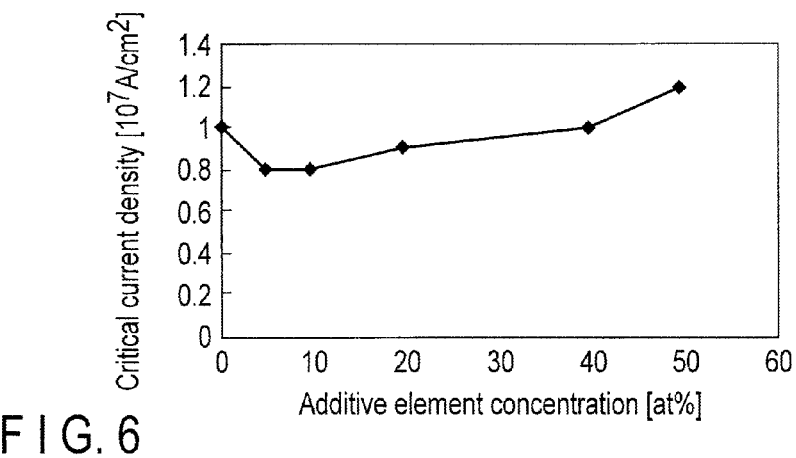
FIG. 6 is a graph showing the relationship between the film thickness of a spin sink layer and the critical current density of a spin torque oscillator used in an embodiment.

FIG. 6 shows the relationship between the Pt additive element concentration in the spin sink layer and the critical current density in the spin torque oscillator manufactured in Example 1.

In Example 1 as shown in FIG. 6, the critical current density decreased when the concentration of Pt of FeCoPt in the spin sink layer was 40 at % or less.

As described above, the spin torque oscillator according to the embodiment can decrease the critical current density.

Example 2

A spin torque oscillator having the following arrangement was manufactured following the same procedures as in Example 1.

Electrode (Ta 5 nm/Cu 250 nm/Ta 35 nm)/underlayer (Ta 3 nm/Ru 2 nm/Cu 2 nm)/main spin transfer layer ((FeCo 0.2 nm/Ni 0.6 nm)*15 layers)/interface magnetic layer (FeCo 0.4 nm)/interlayer (Cu 3 nm)/spin sink layer (FeCo-5 at % Pd 1 nm)/main oscillation layer (FeCo 10 nm)/cap layer (Ru 15 nm)/electrode (Ta 5 nm/Au 100 nm)

The critical current density was measured by using the obtained spin torque oscillator in the same manner as in Example 1.

Figure 7:
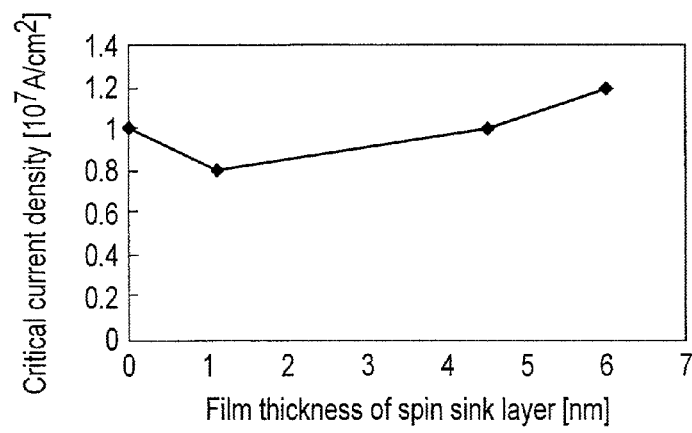
FIG. 7 is a graph showing the relationship between the film thickness of a spin sink layer and the critical current density of a spin torque oscillator used in an embodiment.

FIG. 7 shows the relationship between the film thickness of the spin sink layer and the critical current density in the spin torque oscillator manufactured in Example 2.

In Example 2 as shown in FIG. 7, the critical current density decreased when the film thickness of the spin sink layer was 4.5 nm or less, i.e., the effect of decreasing the critical current density was obtained as in Example 1.

In Example 2, the effect was obtained by a larger film thickness because Pd is an element lighter in weight than Pt and has a small damping constant.

Example 3

A spin torque oscillator having the following arrangement was manufactured following the same procedures as in Example 1.

Electrode (Ta 5 nm/Cu 250 nm/Ta 35 nm)/underlayer (Ta 3 nm/Ru 2 nm/Cu 2 nm)/main spin transfer layer ((FeCo 0.2 nm/Ni 0.6 nm)*15 layers)/interface magnetic layer (FeCo 0.4 nm)/interlayer (Cu 3 nm)/spin sink layer (FeCo 0.8 nm/Ru 0.2 nm)/main oscillation layer (FeCo 10 nm)/cap layer (Ru 15 nm)/electrode (Ta 5 nm/Au 100 nm)

Figure 8:
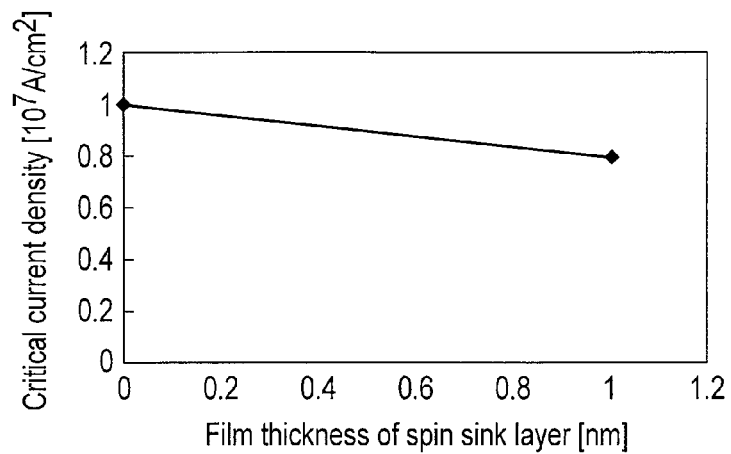
FIG. 8 is a graph showing the relationship between the film thickness of a spin sink layer and the critical current density of a spin torque oscillator used in an embodiment.

FIG. 8 shows the relationship between the film thickness of the spin sink layer and the critical current density in the spin torque oscillator manufactured in Example 3.

In Example 3 as shown in FIG. 8, the critical current density decreased when the film thickness of the spin sink layer was 1.0 nm or less, i.e., the effect of decreasing the critical current density was obtained as in Example 1. Since spin torque transfer is probably complete in the Ru layer of the spin sink layer, it is unnecessary to insert two or more Ru layers. Therefore, the measurement was performed only when the film thickness was 1.0 nm or less.

Example 4

A spin torque oscillator having the following arrangement was manufactured following the same procedures as in Example 1.

Electrode (Ta 5 nm/Cu 250 nm/Ta 35 nm)/underlayer (Ta 3 nm/Pt 2 nm)/main spin transfer layer ((Co 0.4 nm/Pt 0.3 nm)*10 layers)/interface magnetic layer (FeCo 1.5 nm)/interlayer (Cu 3 nm)/spin sink layer ((Co 0.4 nm/Pt 0.3 nm)*3 layers)/main oscillation layer (FeCo 10 nm)/cap layer (Ru 15 nm)/electrode (Ta 5 nm/Au 100 nm)

Figure 9:
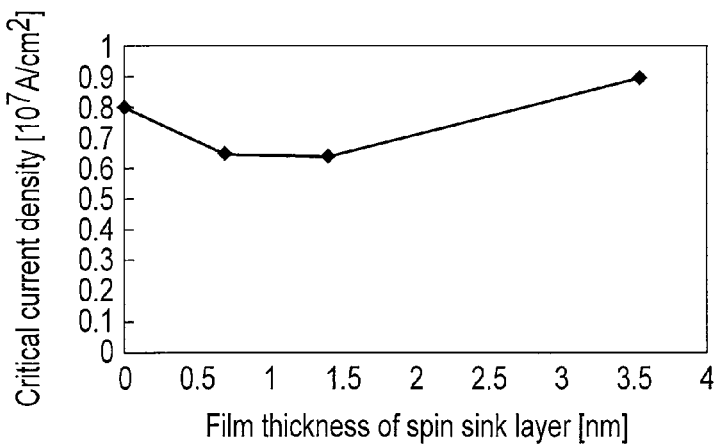
FIG. 9 is a graph showing the relationship between the film thickness of a spin sink layer and the critical current density of a spin torque oscillator used in an embodiment.

FIG. 9 shows the relationship between the film thickness of the spin sink layer and the critical current density in the spin torque oscillator manufactured in Example 4.

In Example 4 as shown in FIG. 9, the critical current density decreased when the film thickness of the spin sink layer was 2.7 nm or less, i.e., the effect of decreasing the critical current density was obtained as in Example 1.

The spin sink layer is a material having perpendicular anisotropy, and gives perpendicular anisotropy to the main oscillation layer by exchange coupling. This effect perhaps further decreased the critical current density.

Example 5

A spin torque oscillator having the following arrangement was manufactured following the same procedures as in Example 1.

Electrode (Ta 5 nm/Cu 250 nm/Ta 35 nm)/underlayer (Ta 3 nm/Pt 2 nm)/main spin transfer layer ([Co 0.4 nm/Pt 0.3 nm]*10 layers)/interface magnetic layer (FeCo 1.5 nm)/interlayer (Cu 3 nm)/spin sink layer ((Co 0.4 nm/Pt 0.3 nm)*3 layers)/main oscillation layer (FeCo-25 at % Al 13 nm)/cap layer (Ru 15 nm)/electrode (Ta 5 nm/Au 100 nm)

Figure 10:
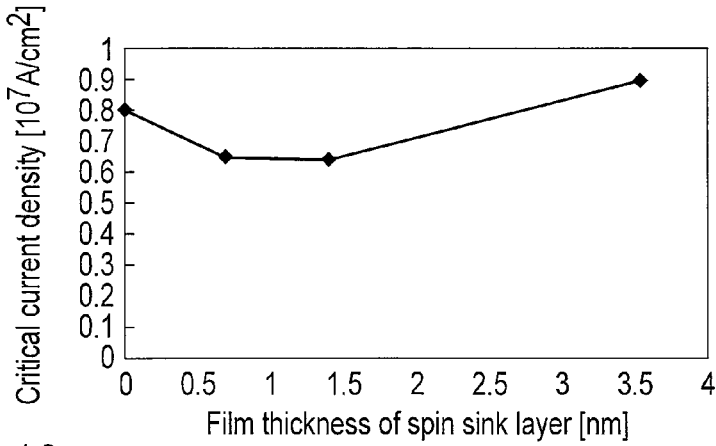
FIG. 10 is a graph showing the relationship between the film thickness of a spin sink layer and the critical current density of a spin torque oscillator used in an embodiment.

FIG. 10 shows the relationship between the film thickness of the spin sink layer and the critical current density in the spin torque oscillator manufactured in Example 5.

In Example 5 as shown in FIG. 10, the critical current density decreased when the film thickness of the spin sink layer was 2.7 nm or less, i.e., the effect of decreasing the critical current density was obtained as in Example 1.

Example 6

A spin torque oscillator having the following arrangement was manufactured following the same procedures as in Example 1.

Electrode (Ta 5 nm/Cu 250 nm/Ta 35 nm)/underlayer (Ta 3 nm/Ru 2 nm/Cu 2 nm)/main spin transfer layer ((FeCo 0.2 nm/Ni 0.6 nm)*15 layers)/interface magnetic layer ((FeCo 0.4 nm)/interlayer (Cu 3 nm)/spin sink layer ((Co 0.4 nm/Pt 0.3 nm)*3 layers)/main oscillation layer (FeCo 1.6 nm/Ni 0.2 nm)*7 layers)/cap layer (Ru 15 nm)/electrode (Ta 5 nm/Au 100 nm)

FIG. 11 shows the relationship between the film thickness of the spin sink layer and the critical current density in the spin torque oscillator manufactured in Example 6.

In Example 6 as shown in FIG. 11, the critical current density decreased when the film thickness of the spin sink layer was 2.7 nm or less, i.e., the effect of decreasing the critical current density was obtained as in Example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording head comprising:
a main magnetic pole configured to apply a recording magnetic field to a magnetic recording medium;
an auxiliary magnetic pole configured to form a magnetic circuit together with the main magnetic pole; and
a spin torque oscillator formed between the main magnetic pole and the auxiliary magnetic pole,
wherein the spin torque oscillator comprises:
a spin transfer layer and an oscillation layer formed in this order from a side of the main magnetic pole,
the oscillation layer including a main oscillation layer and a spin sink layer formed in contact with the main oscillation layer and containing one of iron and cobalt, and 0.5 to 75 at % of at least one element selected from the group consisting of platinum, palladium, ruthenium, tantalum, chromium, terbium, gadolinium, europium, dysprosium, and samarium, in which exchanging coupling acts between the spin sink layer and the main oscillation layer; and
an interlayer formed between the spin transfer layer and the oscillation layer.

2. The head according to claim 1, wherein the spin sink layer is formed by alternately stacking a first spin sink layer containing one of iron and cobalt, and a second spin sink layer containing at least one element selected from the group consisting of platinum, palladium, ruthenium, tantalum, chromium, terbium, gadolinium, europium, dysprosium, and samarium.

3. The head according to claim 1, wherein the main oscillation layer contains at least one element selected from the group consisting of iron, cobalt, and nickel.

4. The head according to claim 3, wherein the main oscillation layer is formed by alternately stacking a layer containing one of iron and cobalt, and a layer containing nickel.

5. The head according to claim 1, wherein the main oscillation layer contains one of iron and cobalt, and at least one element selected from the group consisting of aluminum, silicon, gallium, germanium, copper, silver, gold, boron, manganese, and tin.

6. The head according to claim 5, wherein the main oscillation layer is formed by alternately stacking a layer containing one of iron and cobalt, and a layer containing at least one element selected from the group consisting of aluminum, silicon, gallium, germanium, copper, silver, gold, boron, manganese, and tin.

7. The head according to claim 1, wherein the spin sink layer has a film thickness of 0.1 to 3 nm.

8. The head according to claim 1, wherein a content of the at least one element selected from the group consisting of platinum, palladium, ruthenium, tantalum, chromium, terbium, gadolinium, europium, dysprosium, and samarium is 0.5 to 75 at % of the whole spin sink layer.

9. A magnetic head assembly comprising:
a magnetic recording head including a main magnetic pole configured to apply a recording magnetic field to a magnetic recording medium, an auxiliary magnetic pole configured to form a magnetic circuit together with the main magnetic pole, and a spin torque oscillator formed between the main magnetic pole and the auxiliary magnetic pole;
a head slider on which the magnetic recording head is mounted;
a suspension on one end of which the head slider is mounted; and
an actuator arm connected to the other end of the suspension,
wherein the spin torque oscillator comprises:
a spin transfer layer and an oscillation layer formed in an order named from a side of the main magnetic pole,
the oscillation layer including a main oscillation layer and a spin sink layer formed in contact with the main oscillation layer and containing one of iron and cobalt, and 0.5 to 75 at % of at least one element selected from the group consisting of platinum, palladium, ruthenium, tantalum, chromium, terbium, gadolinium, europium, dysprosium, and samarium, in which exchanging coupling acts between the spin sink layer and the main oscillation layer; and
an interlayer formed between the spin transfer layer and the oscillation layer.

10. The assembly according to claim 9, wherein the spin sink layer is formed by alternately stacking a first spin sink layer containing one of iron and cobalt, and a second spin sink layer containing at least one element selected from the group consisting of platinum, palladium, ruthenium, tantalum, chromium, terbium, gadolinium, europium, dysprosium, and samarium.

11. The assembly according to claim 9, wherein the main oscillation layer contains at least one element selected from the group consisting of iron, cobalt, and nickel.

12. The assembly according to claim 11, wherein the main oscillation layer is formed by alternately stacking a layer containing one of iron and cobalt, and a layer containing nickel.

13. The assembly according to claim 9, wherein the main oscillation layer contains one of iron and cobalt, and at least one element selected from the group consisting of aluminum, silicon, gallium, germanium, copper, silver, gold, boron, manganese, and tin.

14. The assembly according to claim 13, wherein the main oscillation layer is formed by alternately stacking a layer containing one of iron and cobalt, and a layer containing at least one element selected from the group consisting of aluminum, silicon, gallium, germanium, copper, silver, gold, boron, manganese, and tin.

15. The assembly according to claim 9, wherein the spin sink layer has a film thickness of 0.1 to 3 nm.

16. The assembly according to claim 9, wherein a content of the at least one element selected from the group consisting of platinum, palladium, ruthenium, tantalum, chromium, terbium, gadolinium, europium, dysprosium, and samarium is 0.5 to 75 at % of the whole spin sink layer.

17. A magnetic recording/reproduction apparatus comprising:
a magnetic recording medium; and
a magnetic head including
a main magnetic pole configured to apply a recording magnetic field to the magnetic recording medium,
an auxiliary magnetic pole configured to form a magnetic circuit together with the main magnetic pole, and
a spin torque oscillator formed between the main magnetic pole and the auxiliary magnetic pole,
wherein the spin torque oscillator comprises:
a spin transfer layer and an oscillation layer formed in this order from a side of the main magnetic pole,
the oscillation layer including a main oscillation layer and a spin sink layer formed in contact with the main oscillation layer and containing one of iron and cobalt, and 0.5 to 75 at % of at least one element selected from the group consisting of platinum, palladium, ruthenium, tantalum, chromium, terbium, gadolinium, europium, dysprosium, and samarium, in which exchanging coupling acts between the spin sink layer and the main oscillation layer; and
an interlayer formed between the spin transfer layer and the oscillation layer.

18. The apparatus according to claim 17, wherein the spin sink layer is formed by alternately stacking a first spin sink layer containing one of iron and cobalt, and a second spin sink layer containing at least one element selected from the group consisting of platinum, palladium, ruthenium, tantalum, chromium, terbium, gadolinium, europium, dysprosium, and samarium.

19. The apparatus according to claim 17, wherein the main oscillation layer contains at least one element selected from the group consisting of iron, cobalt, and nickel.

20. The apparatus according to claim 19, wherein the main oscillation layer is formed by alternately stacking a layer containing one of iron and cobalt, and a layer containing nickel.

21. The apparatus according to claim 17, wherein the main oscillation layer contains one of iron and cobalt, and at least one element selected from the group consisting of aluminum, silicon, gallium, germanium, copper, silver, gold, boron, manganese, and tin.

22. The apparatus according to claim 21, wherein the main oscillation layer is formed by alternately stacking a layer containing one of iron and cobalt, and a layer containing at least one element selected from the group consisting of aluminum, silicon, gallium, germanium, copper, silver, gold, boron, manganese, and tin.

23. The apparatus according to claim 17, wherein the spin sink layer has a film thickness of 0.1 to 3 nm.

24. The apparatus according to claim 17, wherein a content of the at least one element selected from the group consisting of platinum, palladium, ruthenium, tantalum, chromium, terbium, gadolinium, europium, dysprosium, and samarium is 0.5 to 75 at % of the whole spin sink layer.

25. The head according to claim 1, wherein the spin sink layer is composed of a magnetic alloy containing one of iron and cobalt, and at least one element selected from the group consisting of platinum, palladium, ruthenium, tantalum, chromium, terbium, gadolinium, europium, dysprosium, and samarium.

26. The assembly according to claim 9, wherein the spin sink layer is composed of a magnetic alloy containing one of iron and cobalt, and at least one element selected from the group consisting of platinum, palladium, ruthenium, tantalum, chromium, terbium, gadolinium, europium, dysprosium, and samarium.

27. The apparatus according to claim 17, wherein the spin sink layer is composed of a magnetic alloy containing one of iron and cobalt, and at least one element selected from the group consisting of platinum, palladium, ruthenium, tantalum, chromium, terbium, gadolinium, europium, dysprosium, and samarium.

\* \* \* \* \*